Figure 1:
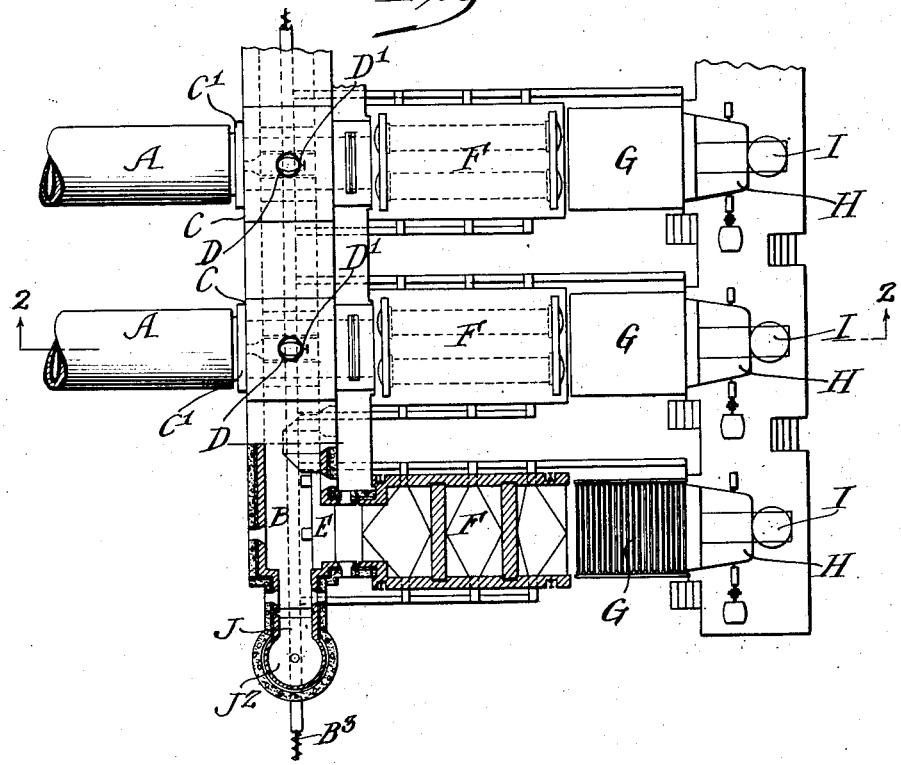

Nov. 10, 1925.

J. E. BELL 1,560,648

WASTE HEAT PLANT AND METHOD OF OPERATING THE SAME

Filed Dec. 23, 1922   2 Sheets-Sheet 1

Inventor
John E. Bell,
by Francis D. [Chandler]
his Attorney.

Nov. 10, 1925. 1,560,648
J. E. BELL
WASTE HEAT PLANT AND METHOD OF OPERATING THE SAME
Filed Dec. 23, 1922 2 Sheets-Sheet 2

Fig. 2.

Fig. 3.

Inventor
John E. Bell,
by Francis C. Lambert
his Attorney.

Patented Nov. 10, 1925.

1,560,648

UNITED STATES PATENT OFFICE.

JOHN E. BELL, OF BROOKLYN, NEW YORK.

WASTE-HEAT PLANT AND METHOD OF OPERATING THE SAME.

Application filed December 23, 1922. Serial No. 608,680.

*To all whom it may concern:*

Be it known that I, JOHN E. BELL, a citizen of the United States of America, and resident of Brooklyn, in the county of Kings and State of New York, have invented a certain new and useful Improvement in Waste-Heat Plants and Methods of Operating the Same, of which the following is a true and exact description, reference being had to the accompanying drawings, which form a part thereof.

My invention relates to waste heat plants of the kind now commonly employed in connection with that form of industrial furnaces known as rotary kilns and in which the gases from the furnaces are delivered into a common waste heat flue and drawn from said flue for heating a plurality of boilers by means of draft fans. A common incident in the operation of such a plant is the shutting down for cleaning, repairs or other purposes of one or more of a plurality of boilers and, as the draft fans are normally operated at close to their capacity, the result of shutting down one or more boilers is that the fans still in use are not capable of handling all the gases given off by the furnaces and the draft through the furnace is therefore diminished below the normal and effective amount. The primary object of my invention is to provide for maintaining a normal and proper draft in the common flue and through the furnaces under all conditions which are likely to occur and I do this by providing an additional gas outlet from the common flue and maintaining in said outlet a suction or draft equal to that normally existing in the flue. My preferred construction for carrying out this purpose is to provide, in connection with the additional outlet from the flue, a stack of such height that when filled with hot gases from the flue there will be produced a draft or suction at the bottom equal to, or greater than, that normally existing in the flue and of such capacity that it will carry off such amount of superfluous gas as may be expected to exist in the flue at any time owing to the shut-down of one or more boilers. The exact amount of the superfluous gas taken care of in this way is controlled by the adjustable area of the opening between the stack and the main collecting flue. In most plants it will be sufficient that the stack should have large enough capacity to carry off an amount of gas which normally passes through a single boiler.

It is not necessary, utilizing my invention, to provide separate stacks for each of the kilns as is the usual practice, and since the housings or chambers at the ends of the kilns do not have to carry the load or weight of separate stacks, they can be placed over and supported by the main collecting flue, and this is one of the features of the invention.

Another object which I have in view is based on the fact that, as heretofore constructed, the common flue, which, for structural reasons, is made relatively high and narrow, receives the gases from the kilns through a side wall and, as the gases are moving with considerable rapidity and the opposite wall is comparatively close to the point of entrance for the gases, objectionable eddies occur which interfere to some extent with the desired draft conditions. My method for diminishing this objectionable feature of the ordinary plant is to introduce the gases from the kilns into the top of the common flue so that their momentum can be expanded through the longer distance between the top and bottom of the flue and thus give rise to less draft inequalities. The dust carried by the gases, which otherwise would be in part dropped on the floor of the housing, passes down through the draft openings into the top of the main flue and is deposited in the bottom of this main flue where it can be easily removed. A small light stack can be put on the top of these housings with a damper between the housing and the stack for use when the kiln is being first started up, or for producing a flow of air through the kiln when work is being done on the lining, but in all regular conditions of operation this stack is unnecessary and its use would be confined to the purposes stated. Other advantages incident to the introduction of the gases through the top of the flue are that it enables me to compact the plant and make the housings into which the furnaces open more accessible, and the furnaces more accessible through the housings, by erecting these housing chambers on top of the common flue. The ports leading downward from the kiln housings into the common flue should, for the best results, be constructed in accordance with the description in my Patent, No. 1,393,738 of October 18, 1911, that is, should be so throttled as to make the pressure drop between the housing and the flue greater than the pressure drop normally existing in the flue, and this construction and method of operation, resulting naturally in a high speed of flow through the ports, makes the advantage derived from the introduction of the gases into the top of the flue more manifest.

My invention will be best understood as described in connection with the drawings in which Figure 1 is a plan view of a plant embodying my improvements and adapted to my new methods of operation, shown partly on sections 1—1 of Fig. 2.

Figure 2 is an elevation shown for the most part on the section line 2—2 of Fig. 1, and Figure 3 is a section on the line 3—3 of Fig. 2.

A, A, indicate rotary cement kilns of which any number can be embodied in the plant. B is the common waste heat flue which is usually constructed, as shown, of relatively considerable height in relation to its breadth. B' is a hopper shaped bottom for the flue from which spouts $B^2$ lead to a conveyor at $B^3$ built under the flue B. At spaced intervals are the kiln housings C having in their front wall openings C' which register with the ends of the kilns and are usually surrounded by some sealing device diagrammatically indicated at $C^2$. The opposite or rear walls $C^3$ of these housings are shown as provided with a pipe opening $C^4$ through which a thermo-couple can be introduced and with inspection openings lying directly opposite to the mouth of the kiln and indicated at $C^5$, $C^5$. $C^6$, $C^6$, indicate openings extending from the bottom of the housings into the top of the flue B and these openings or ports should be so restricted as to bring about a pressure drop through these ports somewhat in excess of the pressure loss in the connecting flue. D, D, indicate stacks, damper controlled, by which at will the gases from the kiln can be thrown off from the housing without passing into the common flue. E, E, are ports leading from the flue B into the waste heat boilers indicated at F, F, and thence through economizers indicated at G, G, to ovens H and stacks I. J is an opening leading from the common flue B to a stack $J^2$, J' indicating a guideway for a damper by which the opening J can be regulated or closed at will. The stack $J^2$ should be of such height that when filled with hot gases from the flue it will create a suction equal to that normally existing in the flue B while the capacity of the stack $J^2$ should be such that it can, in case of emergency, carry off such amount of gases as the kilns deliver to the flue through their housing C over and above that which the boilers in use are capable of drawing from the flue. Ordinarily, as I have noted, it will be sufficient that the stack $J^2$ should have capacity to carry off the gases normally passing through one of the boilers.

Having now described my invention what I claim as new and desire to secure by Letters Patent, is:

1. The method of maintaining even draft conditions in a plant consisting of one or more industrial furnaces, a common flue into which they deliver their gases and a plurality of waste heat boilers connected to utilize gases from said flue and having draft fans for maintaining a proper draft, which consists in providing an outlet for gases from the flue other than those through the boilers and fans, and maintaining in said outlet a suction equal to the suction normally existing in the common flue.

2. The method of maintaining even draft conditions in a plant consisting of one or more industrial furnaces, a high and relatively narrow common flue into which they deliver their gases and a plurality of waste heat boilers connected to utilize gases from the flue and having draft fans for maintaining a proper draft, which consists in introducing the gases from the furnaces into the flue through the top thereof, providing an outlet for gases from the flue other than those through the boilers and maintaining in said outlet a suction equal to the suction normally existing in the common flue.

3. The method of maintaining even draft conditions in a plant consisting of one or more industrial furnaces, a high and relatively narrow common flue into which they deliver their gases and a plurality of waste heat boilers connected to utilize gases from the flue and having draft fans for maintaining a proper draft, which consists in introducing the gases from the furnaces into the flue through the top thereof, throttling the ports through the top of the flue so as to make the pressure drop therein greater than that in the common flue, providing an outlet for gases from the flue other than those through the boilers and maintaining in said outlet a suction equal to the suction normally existing in the common flue.

4. In a plant comprising one or more industrial furnaces, a common flue for receiving their gases and a plurality of waste heat boilers connected to said flue, and having draft fans for maintaining a proper draft, the combination therewith of a draft stack connected to the common flue of a height adapted to maintain a suction in the flue and furnaces equal to that normally existing therein and a capacity which will enable it to carry off excess gases in the flue when one or more but not all of the boilers and fans are not in use.

5. In a plant comprising one or more industrial furnaces each having a housing chamber into which the gases from the furnaces pass, a common flue for receiving the gases from said chambers and a plurality of waste heat boilers connected to said flue, and having draft fans for maintaining a proper draft, the combination therewith of a draft stack connected to the common flue of a height adapted to maintain a suction in the flue and furnaces equal to that normally existing therein and a capacity which will enable it to carry off excess gases in the flue when one or more but not all of the boilers and fans are not in use and a series of stacks connected one to each housing chamber through which the gases from the connected furnaces can be diverted at will.

6. A waste heat using kiln plant comprising in combination a horizontal flue, housing chamber for the upper ends of the kilns erected on top of the horizontal flue and opening into the top of said flue through their bottoms, rotary kilns opening into the housing chamber and waste heat boilers connected to the flue.

7. A waste heat using kiln plant comprising in combination a horizontal flue, housing chambers for the upper ends of the kilns erected on top of the horizontal flues and opening into the top of said flue through their bottoms, damper controlled stacks leading from each housing chamber, rotary kilns opening into the housing chamber and waste heat boilers connected to the flue.

8. A waste heat using kiln plant comprising in combination a horizontal flue, a dust conveyer for carrying off the dust from the bottom of the flue, housing chambers for the upper ends of the kilns erected on top of the horizontal flue and opening into the top of said flue through their bottoms, rotary kilns opening into the housing chamber and waste heat boilers connected to the flue.

JOHN E. BELL.